Feb. 27, 1934.   J. A. LAMBIE   1,949,055
FLEXIBLE IRRIGATION PIPE COUPLING
Filed Jan. 5, 1932
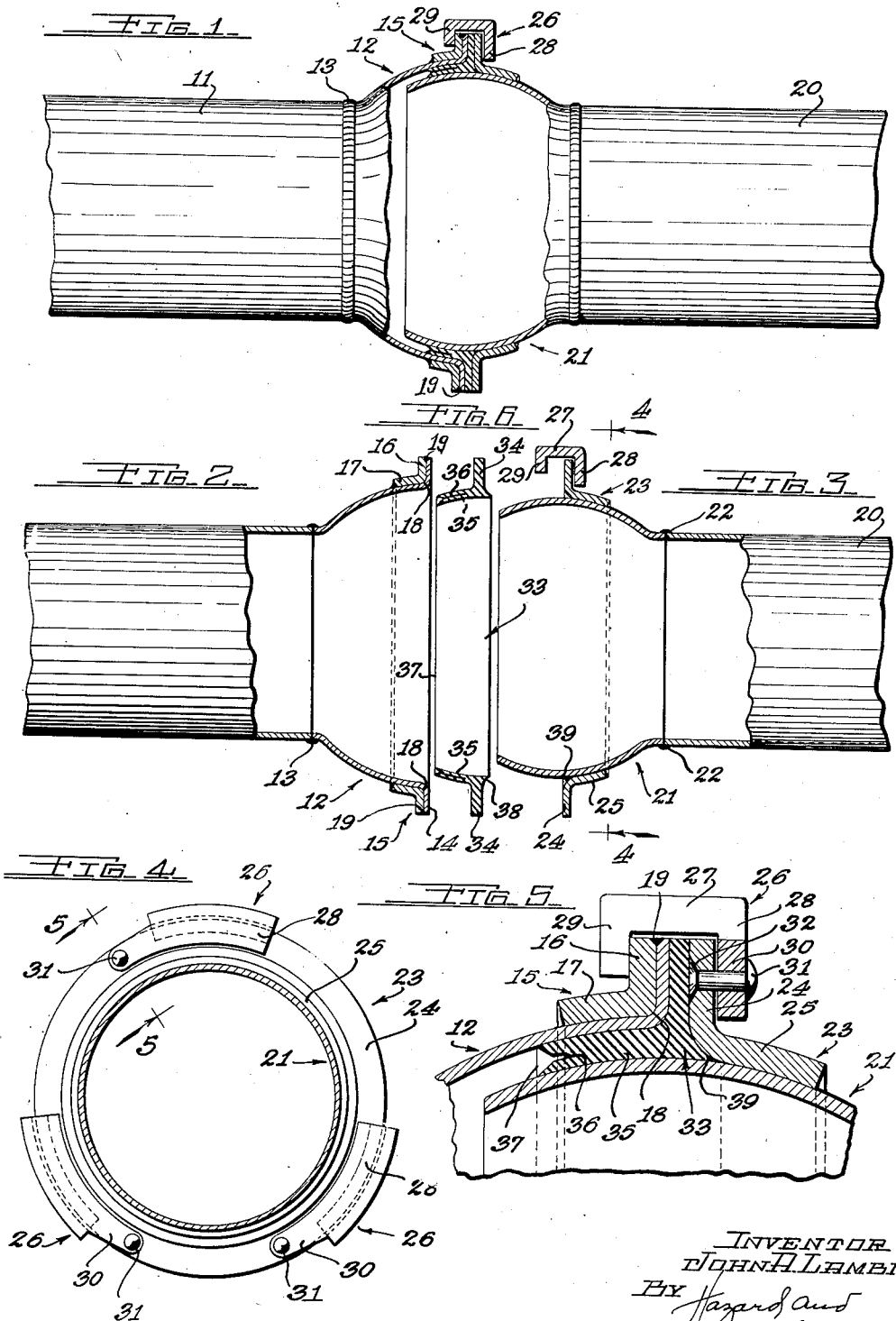
INVENTOR
JOHN A. LAMBIE
BY Hazard and
Miller
ATTORNEYS Patented Feb. 27, 1934

1,949,055

UNITED STATES PATENT OFFICE 1,949,055

FLEXIBLE IRRIGATION PIPE COUPLING

John Alfred Lambie, Los Angeles, Calif., assignor of one-half to West Coast Pipe and Steel Co., Los Angeles, Calif., a corporation of California, and one-half to Rain Machine, Ltd., Lompoc, Calif., a corporation of California Application January 5, 1932. Serial No. 584,822

8 Claims. (Cl. 285—91)

My invention pertains to a pipe coupling which is adapted as a flexible coupling or connection; the particular use for which it is designed is for overhead irrigation. In the type of irrigation for which my coupling is especially advantageous is that in which the ground lines are coupled together for carrying the water to a tract of land following the contour of the surface of the land, and when a particular area has been irrigated the pipes are uncoupled and moved to another section, again connected, and this other section is irrigated. Therefore, by the system for which this light type of coupling is designed, it necessitates the quick connection and disconnection of the couplings or joints, and these require to be flexible to allow an angularity between two connecting pipes. This angularity is attained by a ball and socket type of joint.

An object and feature of my invention in this type of coupling is the construction of a ball and socket type of coupling which permits ready assembling of the two main rigid members and in which a gasket is utilized which forms a water tight seal when the pipe sections are clamped together and water pressure develops in the pipes and the coupling.

Another feature of my invention relates to a quick operating clamping device for the flange construction on the two parts of the pipe coupling, this having pivoted channel structures which engage over flanges on the two pipe sections.

Another detailed feature of my invention is constructing both the bell and the ball of the joint of spun metal which is secured to the respective pipes by a welded joint. The bell is provided with a reinforcing rim, this having a radial flange welded to a spun radial flange of the bell. The ball fitting in the bell has a loosely mounted ring thereon, which ring has a series of pivotally mounted clamps of channel shape in cross section secured to its projecting rim. The gasket consists of a rubber ring having an outwardly extending flange fitting between the flanges on the bell and the shiftable ring on the ball. It is provided with a web to fit in the bell which is split on the edges and which expands under pressure and forms a water tight seal. A fillet on the rubber gasket fits snugly against the curved section of the ring on the ball and prevents nickage at this joint.

My invention is illustrated in connection with the accompanying drawing, in which:

Fig. 1 is a side elevation of two connected pipes, showing the coupling in longitudinal section;

Fig. 2 illustrates a vertical section through the bell portion of the coupling;

Fig. 3 illustrates a vertical section through the ball portion of the coupling;

Fig. 4 is a transverse section on the line 4—4 of Fig. 3 in the direction of the arrows;

Fig. 5 is a detail section on the line 5—5 of Fig. 4 taken in the direction of the arrows;

Fig. 6 is a longitudinal section through the resilient gasket or packing.

Referring first to the bell construction, I employ a water pipe 11 which has a bell 12 secured thereto by a welded joint 13. This bell is spun to be spherical on the inside and has a spun radial flange 14. A strengthening, reinforcing rim 15 is also preferably formed of pressed metal and has a radial flange 16 fitting snugly against the flange 14 and a web section 17 fitting snugly and tightly against the outside of the bell. This rim is bent to conform to the curve 18 made in forming the flange on the metal of the bell. The rim is attached to the bell and to the flange 14 by spot welding or by welding at the periphery indicated 19.

The ball section of the coupling employs a water pipe 20 with a ball 21 secured thereto by a weld joint 22. The ball is spun to be spherical and is accommodated inside of the bell. A loose fitting ring 23 has a radial flange 24 and a spherical curved web 25, the web fitting snugly on the outside of the ball. This may tilt to accommodate the angularity of one pipe to the other when the coupling is made. The clamps 26 are channel-shaped, having a web 27, a long flange 28 on one side, and a shorter flange 29 on the other. The flange 28 has an extension 30 at one end through which extends a pivot rivet 31, this rivet having its one head countersunk as indicated at 32 in the flange 24 of the ring 23. In the illustration three of these clamps are shown, which is satisfactory for moderately sized pipes, but for larger pipes more channel-shaped clamps should be used.

The gasket or packing ring 33 is preferably formed of good quality rubber and has a radial flange 34, from which extends a web 35 which is molded with spherical inside and outside surfaces. This web has an annular split 36 extending inwardly from the edge 37. A curved fillet 38 is formed on the packing ring or gasket on the side opposite the web.

In assembling the pipe coupling the rubber packing or gasket is preferably fitted in the end of the bell with the flange 34 fitting snugly against the flange 14 of the bell and the web 35 fitting snugly in the end portion of the spherical bell. The ball is then inserted through the gasket or packing and the ring 23 manipulated to bring the radial flange 24 snugly against the flange 34 of the gasket. This is done with the clamps 26 tilted outwardly on their pivot rivets 31. These clamps are then forced inwardly so that the wide flange 28 engages over the outside of the flange 24 on the ball and the short flange 29 engages over the flange 16 of the reinforcing rim 15 on the bell. The plurality of separate clamps securely attach the two sections of the coupling together and allow the pipes 11 and 20 to be at an angle one to the other. When coupled together the fillet 38 of the gasket fits between the convex curved portion 39 of the ring 23 and the outside of the ball, this being illustrated clearly in Figs. 1 and 5.

It is obvious that the gasket or packing plate may, if desired, be first assembled on the ball fitting snugly against the ring 23, and then the ball with the gasket or packing inserted in the bell.

When the pipe and coupling are under hydraulic pressure, the split 36 in the web portion of the gasket expands or separates as illustrated in Fig. 5, forming a tight seal between the ball on the outside and the bell on the inside of the coupling. The hydraulic pressure also tends to force the fillet 38 into a snugger fit with the ring 23 and the ball than that done by the clamping of the two sections together. It will thus be seen that I have developed a light weight flexible coupling which may be readily assembled and disassembled.

A feature of my invention which aids in forming an effective seal by means of the packing ring 33 is that the web section 35 has a free inner edge 37 which is unconfined and has the annular split 36. This causes both extreme edges to have a type of feather edge, which, under pressure, expands against the inside ball and the outside bell. In addition, the fillet 38 is forced by pressure into the curved portion 39 of the ring 23.

A characteristic feature of my invention is that the flange on the bell 12 is substantially in a diametrical plane through the center of which the spherical shape of the bell is formed. Also the bell is concentric with the ball, the gasket also has a web which is concentric both to the bell and the ball, and the flange of the gasket when the pipes are clamped together is substantially in a diametrical plane through the center of the spheres formed by the ball, the web of the gasket and the bell, therefore the web portion of the gasket engages the ball at a portion to one side of a diametrical plane and thus restricts the entrance of the ball into the bell when the pipes are in clamped relation. This is of importance in preventing or reducing leakage at low water pressures as the pipe 20 having the ball cannot be shoved into the bell beyond the location intended to form a leak-tight joint. Manifestly when the pressure is great, the gasket forms a tight seal and after the ball is turned inwardly into the bell it compresses the gasket and forms a tight seal at the low water pressures.

Various changes may be made in the details of construction without departing from the spirit or scope of the invention as defined by the appended claims.

I claim:

1. A flexible coupling having a first pipe with a bell having a radial flange, a second pipe having a ball to interfit with the bell, a loose fitting ring on the ball having a curved web to engage the ball and a radial flange, a resilient packing gasket having a web section to fit between the ball and the bell and molded to conform to the shape of the ball and the bell, a radial flange extending outwardly from the web to engage between the flanges on the ring and the bell, and a plurality of channel-shaped clamps pivotally connected to the flange of the ring, each channel having its web extending over the periphery of the three flanges, and each channel having opposite flanges engaging the flange on the bell and the flange on the ring, the bell having a reinforcing rim secured thereto at the flange, said rim having a radial flange and having a curved web section fitting against the exterior of the bell, said rim being welded to the bell.

2. A flexible coupling having a first pipe with a spun spherical bell welded thereto, said bell having a radial flange, a rim secured to the bell on the outside having a web conforming to the exterior shape of the bell adjacent its flange, said rim having a flange fitted snugly against the flange of the bell, said rim and bell being welded together, a second pipe having a ball spun to spherical shape, the ball and bell being concentric, a ring loosely fitting on the ball, said ring having a web engaging the exterior of the ball and a radial flange, a packing gasket fitting between the flange of the bell and the flange of the ring, and means to detachably clamp the flanges of the bell and the ring together, the gasket having a free inner edge with a radial flange engaged by the flanges of the ring and the bell, and a spherical-shaped web having an annular split, the web fitting between the bell and the ball and having a fillet to fit against the exterior of the ring on the ball.

3. A flexible coupling having a first pipe with a ball, said ball being partly spherical on its outer surface, a loose-fitting ring having a web concentric to and fitted on the ball and having a radial flange, a second pipe having a bell concentric on its inner surface with the ball being partly spherical and spaced outside of the ball, an integral radial flange on the bell, a packing gasket having a partly spherical shape, said gasket being fitted between the bell and the ball and having a radial flange fitted between the flange of the bell and the flange of the ring, and means to clamp the flange on the ring and the flange of the bell together, the web and the flange of the ring having a convex curvature at their meeting angle adjacent the ball, and the gasket having a concave-shaped fillet to fit against the convex-curved angle.

4. A flexible coupling having a first pipe with a ball spherical on its outside surface, a ring having a web and a radial flange loosely fitting on the ball, a bell having its inside surface concentric with that of the exterior of the ball and having an integral flange, a packing gasket having a web section fitted between the exterior surface of the ball and the interior surface of the bell, a plurality of clamps each formed channel-shaped and having a long flange on one side and pivotally connected to the flange of the ring by a pivot transverse to such flange and having a shorter flange to engage the flange on the bell, the web of the gasket being concentric to the center of the ball and the portion of the web engaging the flange of the ring being substantially on a diametrical plane through the center of the ball, the said web of the gasket engaging the ball to one side of a diametrical plane through the ball and limiting the entrance of the ball into the bell when the bell and the ball are coupled together.

5. A flexible coupling having a first pipe with a ball spun thereon, said ball being spherical and having concentric inside and outside surfaces, a loose-fitting ring having a web conforming to the exterior of the ball and having a radial flange, a second pipe having a spun bell with spherical inside and outside surfaces concentric with the ball, the inside surface of the bell and the outside surface of the ball being spaced apart, a flange formed integral with the bell and having a reinforcing, a resilient gasket formed with a spherical shape fitted between the bell and the ball and having a portion bearing against the flange of the ring, the free end of the gasket having an annular split for expansion of the split sections between both the bell and the ball, and means to clamp the flange of the ring and the flange of the bell together, the outside angle of the flange and the web of the ring being convex, the gasket having a radial flange fitted between the flange of the ring and the flange of the bell and having a concave fillet to conform to said convex curve of said flange and web of the ring, the clamp securing the flange of the gasket between the flange of the bell and the flange of the ring.

6. A flexible coupling having a first pipe with a ball thereon spherical on its outside surface, a ring having a web and a radial flange, the web having a loose fit on the ball, a second pipe having a bell with an inside surface concentric with that of the exterior of the ball and having an integral radial flange thereon, the said flange being substantially in a diametrical plane through the center of the bell, a packing gasket having a web concentric with the ball and fitted between the exterior surface of the ball and the interior surface of the bell, means to clamp the flange of the bell and the flange of the ring together, one edge of the gasket engaging the flange of the ring, the said gasket limiting the entrance of the ball into the bell when the flanges are in clamped relation.

7. A flexible coupling having a first pipe with a ball spherical on its outside surface, a ring having a web and a radial flange, the web loosely fitting on the ball, a second pipe having a bell with its inside surface concentric with that of the center of the ball and having an integral radial flange located substantially in a diametrical plane through the center of the sphere of the bell, a packing gasket having a web section concentric with the ball, and a radial flange, the web of the gasket fitting between the exterior of the ball and the interior of the bell and the flange of the gasket fitting between the flange of the bell and the flange of the ring, and means to clamp the flange of the bell and the flange of the ring together, the web on the gasket limiting the entrance of the ball into the bell when the pipes are in clamped relation.

8. A flexible coupling as claimed in claim 7, the packing gasket having an annular split from its inner edge, the said split being concentric with the ball and the bell whereby the free edges may, on pressure, expand against the ball and the bell.

JOHN A. LAMBIE.